Aug. 4, 1970  KAZUO OISHI ET AL  3,523,211
CONDENSER-DISCHARGE IGNITION SYSTEM
WITH A SILICON CONTROL RECTIFIER

Filed Dec. 12, 1968  2 Sheets-Sheet 1

INVENTORS
KAZUO OISHI AND
KUNIHIKO NEGI
BY
*Linton and Linton*
ATTORNEYS

INVENTORS
KAZUO OISHI AND
KUNIHIKO NEGI
BY
*Linton and Linton*
ATTORNEYS

United States Patent Office 3,523,211
Patented Aug. 4, 1970

1

3,523,211
CONDENSER-DISCHARGE IGNITION SYSTEM WITH A SILICON CONTROL RECTIFIER
Kazuo Oishi, % Seimeiryo 12, 7-chome, Tenno-cho, Kariya-shi, and Kunihiko Negi, 3, 1-chome, Doichi-cho, Mizuho-ku, Nagoya-shi, both of Aichi-ken, Japan
Continuation-in-part of application Ser. No. 481,487, Aug. 23, 1965. This application Dec. 12, 1968, Ser. No. 783,386
Int. Cl. F02p *15/00;* H05b *41/14*
U.S. Cl. 315—209          1 Claim

ABSTRACT OF THE DISCLOSURE

A condenser-discharge ignition system known per se and improved by providing another circuit connected in parallel with a primary winding disposed in a known manner, the circuit comprising a diode and an inductance connected in series with the diode which is disposed in such a position that the direction of the unidirectional conductivity thereof is in reverse to the direction of the unidirectional conductivity of a silicon control rectifier connected in series with the primary winding and also with the circuit. The improved system is advantageous in a long lasting arc and in the fact that the inductance is not heated.

CROSS-REFERENCES TO RELATED APPLICATIONS

This application is a continuation-in-part of our co-pending prior application Ser. No. 481,487, filed Aug. 23, 1965, and now abandoned.

BACKGROUND OF THE INVENTION

Field of the invention

The field of art to which this invention pertains is the ignition system for the automobile.

Description of the prior art

A condenser-discharge ignition system comprising a condenser adapted to be charged by a direct current, an ignition coil having a primary winding, and a silicon control rectifier, in which a circuit comprising the primary winding and the silicon control rectifier connected in series therewith and connected in parallel with the condenser, is known per se. In an example of such known system, a diode for the DC arc is connected in parallel with the primary winding as shown in FIG. 1. In operation of the circuitry shown in FIG. 1, (1) the condenser 1 for discharge is at first charged by a DC–DC converter 6, of which the polarity is as shown in FIG. 1. (2) When the condenser 1 has been properly charged, a trigger pulse is put into the gate of the silicon control rectifier 4, whereby the rectifier 4 is brought into the conductive state so that the charge in the condenser 1 is discharged through the primary winding 2 and the silicon control rectifier 4. (3) When the charge has been consumed, the voltage between both terminals of the primary winding 2 of the coil 3 becomes zero while the current reaches its maximum. When the diode 5 is turned on, the currents flowing to the both sides of the coil 3 are attenuated. (4) Thereafter, there are no voltages across the condenser 1 and between the terminals of the coil 3.

In FIG. 2, in which five graphs (A), (B), (C), (D), and (E) are jointed, and the abscissa represents a common time $t$, there are illustrated variations in the terminal voltage $V_C$ of the discharging condenser 1, the current $I_1$ flowing across the primary winding 2, the voltage $V_{SCR}$ between the anode and cathode of the silicon control rectifier 4, the current $I_{SCR}$ passing across the silicon control rectifier 4, and the terminal voltage $V_1$ of the primary winding 2, by ordinate, respectively, correspondingly to the above description. In these graphs, the time $t_0$ corresponds to the description (3), whereafter the polarity shown in FIG. 1 will try to reverse itself, but, in fact, it will not be reversed by virtue of the DC arc diode 5. Consequently, the terminal voltage $V_C$ of the discharging condenser 1 as well as the terminal voltage $V_1$ of the primary winding 2 will remain as zero as they are as described in the above (4). The current $I_1$ flowing across the primary winding 2 will decrease gradually with the lapse of time $t$ and a DC arc discharge will occur at a spark plug 8. On the other hand, a current, though very little, runs all the time from the DC–DC converter 6 to the silicon control rectifier 4 through the primary winding 2, by virtue of which the silicon control rectifier 4 may be hard to be turned off. Thus a back current does not flow across the silicon control rectifier 4 during the phase (4) as above and thereafter. As long as the silicon control rectifier 4 does not turn off, it is impossible to charge the condenser 1 again.

There is such a merit that, by virtue of the provision of the diode 5, energy discharged from the condenser 1 is stored by the coil 3 and then consumed thoroughly through the circuits including the coil 3, the ignition plug 8, and the diode 5, so that a large energy is used at the ignition plug 8. Consequently, the arc lasts for a long period at the ignition plug 8. On the other hand, the circuitry as shown in FIG. 1 is extremely disadvantageous in the fact that it is very difficult to charge again for the next igniting action. Furthermore, if there is a mistake in the action of the silicon control rectifier, the DC–DC converter would be broken, because it is always kept in the state of being short-circuited at the loaded side thereof.

Another circuitry for the ignition system, as illustrated in FIG. 3, has been disclosed in a U.S. patent. In accordance with this prior art, there is provided a circuit comprising an inductance 41 and a diode 19 connected in series with the inductance 41 is connected with the condenser 3 in parallel and also in parallel with another circuit comprising a primary winding 4 and a silicon control rectifier 5 connected in series therewith. Now a discharge occurs across the primary winding 4 and the silicon control rectifier 5 similarly to the preceding example as shown in FIG. 1. The current arrives at the maximum at $t_0$ in FIG. 4 (D), which corresponds to FIG. 2 (D) for the preceding example. Since that time the diode 19 is brought into the conductive state, so that a current flows across the primary winding 4 and the silicon control rectifier 5 as well as the inductance 41 and the diode 19. By virtue of the inductance 41, the current partly flows across the condenser 3 in the opposite direction to the original flow so that the condenser 3 is charged invertedly. This invertedly charged potential is discharged then across the diode 19 and the inductance 41.

There is such a defect in the above circuitry that it is disadvantageously difficult to turn off the silicon control rectifier 5, because the current passing the diode 19 passes also through the silicon control rectifier 5 in the positive or forward direction which is never altered as long as the diode 19 is energized. By virtue of the existence of the inductance 41, the polarity of the charge in the condenser 3 is once inverted. Although the direction of the inverted charge ought to facilitate the turning off of the silicon control rectifier, the inverted charge is, however, not useful for turning off the silicon control rectifier 5 but, in fact, it is discharged across the diode 19 and the inductance 41.

One object of this invention is to provide a condenser-discharge ignition system in which duration of the arcing current is sufficiently long in the spark gap of the ignition plug, and the silicon control rectifier is turned off definitely.

Another object of this invention is to provide a condenser-discharge ignition system in which the charge accumulated in the discharging condenser is used efficiently, that is, an electrostatic energy in the discharging condenser is changed into an electromagnetic energy in the ignition coil, thereafter, a part of the electromagnetic energy is again changed into an electrostatic energy which is required for turning off the silicon control rectifier, and the balance of the electromagnetic energy is released at the ignition plug directly but not again being changed into an electrostatic energy in the condenser.

Still another object of this invention is to provide a condenser-discharge ignition system in which electrostatic energy in the condenser is once changed into electromagnetic energy in the coil, thereafter, an extremely slight part of the electromagnetic energy is returned into the condenser as an electrostatic energy across the silicon control rectifier. The charge is again charged in the condenser, which is very slight and reversely polarized to the original charge, turns off the silicon control rectifier.

A further object of this invention is to provide a condenser-discharge ignition system in which turning off of the silicon control rectifier is made easy by means of such a circuitry that an energy which was once accumulated in a coil as an electromagnetic energy, is discharged across a circuit consisting in series of an inductance and a diode, the discharging current not passing across the silicon control rectifier.

A further object of this invention is to provide a condenser-discharge ignition system in which the DC–DC converter is prevented from damage caused by a continuous load.

A further object of this invention is to provide a condenser-discharge ignition system in which the inductance is not heated.

SUMMARY OF THE INVENTION

Briefly stated, in accordance with one aspect of this invention, there is provided a condenser-discharge ignition system comprising a DC–DC converter having a positive pole and a negative pole, a condenser, an ignition coil having a primary winding and a secondary winding, an ignition plug having a cathode first pole and an earthing pole, a silicon control rectifier having an anode and a cathode, a diode having an anode and a cathode, and an inductance. The condenser is connected between the converter positive pole and the converter negative pole. The converter positive pole is connected with the anode of the silicon control rectifier across the primary winding. The converter negative pole is connected with the cathode of the silicon control rectifier. One end of the secondary winding is connected with the cathode first pole of the ignition plug. The earthing pole of the ignition plug is connected with the other end of the secondary winding, the negative pole of said converter, and a ground. A circuit containing the diode and the inductance connected in series is connected in parallel with the primary winding and the diode is connected and poled in such a manner that a current tending to flow from the converter positive pole to the converter negative pole is prevented from flowing across the circuit.

BRIEF DESCRIPTION OF THE DRAWING

This invention will be better understood and other objects and additional advantages of the present invention will become apparent upon perusal of the following description taken in connection with the drawings, in which.

DESCRIPTION OF THE PREFERRED EMBODIMENT

Figure 1:
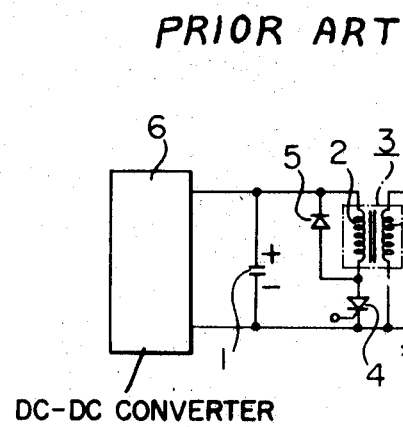
FIG. 1 is an electric circuit diagram of a convention condenser-discharge ignition system with a silicon control rectifier.
Figure 2:
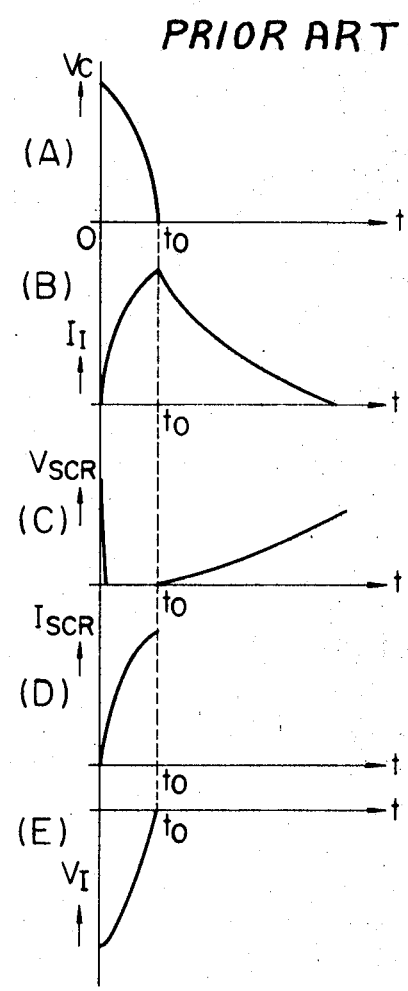
FIG. 2 is a graph in which five graphs (A), (B), (C), (D), and (E) for five variables in connection with the circuit shown in FIG. 1 are joined.
Figure 3:
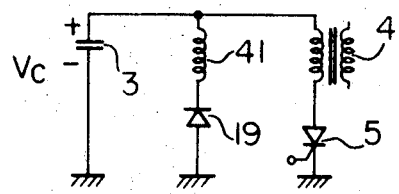
FIG. 3 is an electric circuit diagram of another known condenser-discharge ignition system with a silicon control rectifier.

Referring more particularly to the drawings, the preferred embodiment of this invention will now be described; however, this description will be understood to be illustrative of the invention and not as limiting it to the particular arrangement shown and described. A condenser 1 is connected between a positive pole and a negative pole of a DC–DC converter 6. The converter positive pole is connected with the anode of a silicon control rectifier 4 across a primary winding 2 of an ignition coil 3. The converter negative pole is connected with the cathode of the silicon control rectifier 4. One end of the secondary winding 7 of the ignition coil 3 is connected with a cathode first pole of the ignition plug. The earthing pole of the ignition plug 8 is connected with the other end of the secondary winding 7 of the ignition coil 3 and also connected with the negative pole of said converter and a ground.

Figure 5:
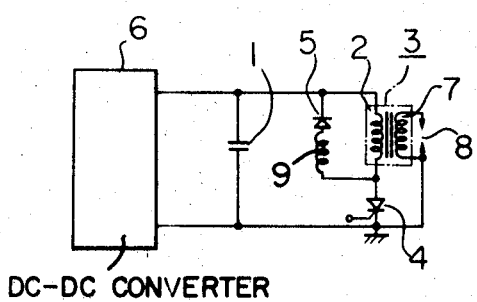
FIG. 5 is an electric circuit diagram of a condenser-discharge ignition system with a silicon control rectifier embodying this invention.

In accordance with this invention, a circuit containing a diode 5 and an inductance 9 connected in series is further connected in parallel with the primary winding 2, conditional on that the diode 5 is connected and poled in such a manner that a current tending to flow from the converter positive pole to the converter negative pole is prevented from flowing across the circuit, as shown in FIG. 5.

Figure 6:
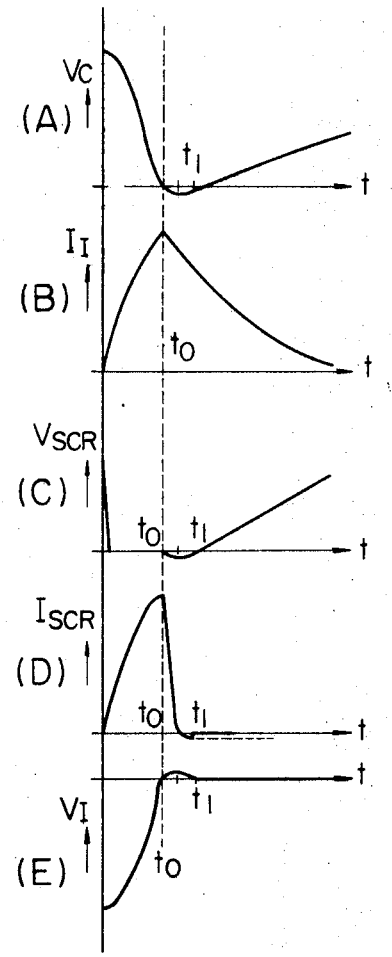
FIG. 6 is a graph in which five graphs (A), (B), (C), (D), and (E) for five variables in connection with the circuit shown in FIG. 5, are joined corresponding to FIG. 2.

In operation, the circuitry as above in accordance with this invention acts quite similarly to that described hereinbefore in connection with FIG. 1 before the current flowing across the silicon control rectifier 4 has been maximized or till the time $t_0$ in FIG. 6.

Figure 4:
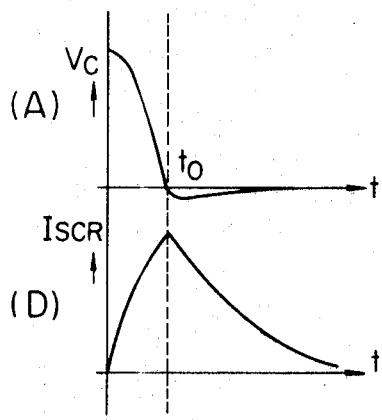
FIG. 4 is a graph in which two graphs (A) and (D) for two variables in connection with the circuit shown in FIG. 3, are joined.

Subsequent to the time $t_c$, the terminal voltage $V_1$ of the primary winding 2 is inverted to a reverse polarity, and therefore, the DC arc diode 5 is turned on. Whereas, since the current flowing and passing across the diode 5 is controlled by the inductance 9, the current $I_{SCR}$ passing across the silicon control rectifier 4 does not reduce itself sharply to zero even after the time $t_0$, as shown in FIG. 4(D), but gradually decreases, and the electromagnetic energy in the primary winding 2 is not completely consumed, and therefore a current of reverse polarity begins to flow eventually.

The condenser 1 is invertedly charged by the current from the maximum to zero of the current $I_{SCR}$. After the current $I_{SCR}$ has become zero, an inverse current flows across the silicon control rectifier 4 due to the charge. Meantime, a current flowing across the primary winding 2 of the coil 3 does not flow across the silicon control rectifier 4, but flows across the diode 5 and the inductance 9 so that only the above-mentioned inverse current flows across the silicon control rectifier 4 by being discharged from the condenser 1. The silicon control rectifier 4 is easily turned off by this inverse current. Consequently, the terminal voltage $V_c$ of the discharging condenser 1 and the terminal voltage $V_1$ of the primary winding 2 are rendered respectively reverse polarity voltages although they are small, as shown in FIGS. 6(A) and 6(E). If and when the silicon control rectifier 4 refuses to be turned off, it is quite natural that the current $I_{SCR}$ passing across the reverse polarity silicon control rectifier 4 should run as is shown with a dotted line in FIG. 6(D). But the result is inevitably that the silicon control rectifier 4 has been turned off because of the current $I_{SCR}$ of reverse polarity overcoming the current running through the primary winding 2 from the DC–DC converter 6, so that the object of the present invention may be achieved then for the first time.

By virtue of this circuit, it is further possible to obtain a current across the ignition plug 8, which has the same wave form with the primary current $I_1$ of the ignition coil, resulting in that it is possible to pass a current across the ignition plug 8, which is substantially the same with the case of the conventional DC arc where only a diode is connected with a primary winding of a coil, so that this circuitry is suitable for igniting a fuel.

The foregoing action will be explained more in detail as follow: The current $I_{SCR}$ flowing across the silicon control rectifier 4 subsequent to the time $t_0$ or after the DC arc diode 5 comes on serves to charge the condenser 1 reversely, and the amount of the electric charge with which the condenser 1 is charged is an integral value for the time of the current flowing from the time $t_0$ to a time $t_1$ when the current $I_{SCR}$ passing across the silicon control rectifier 4 comes to zero. The current $I_{SCR}$ flows across the silicon control rectifier 4 during a period of from the time $t_0$ to the time $t_1$. During a part of the period the current $I_{SCR}$ flows reversely due to the charge reversely charged in the condenser 1. By virtue of this reverse current the silicon control rectifier 4 is surely turned off. This reverse current flows from the negative pole of the condenser 1 to the positive pole thereof across the silicon control rectifier 4, the inductance 9, and the diode 5 while another current flows from the primary winding 2 across the same inductance and the same diode circulatingly.

The turning off of the silicon control rectifier 4 is significant for the preparation of the next igniting operation. Such turning off after an igniting operation is absolutely necessary. In addition, the DC–DC converter is protected from damage due to a continuous load.

Some characteristics for an embodiment of the condenser-discharge ignition system in accordance with this invention were as follows:

Discharging condenser 1—1.5 µf.
Number of turns of the primary winding 2—220 turns
Number of turns of the secondary winding 7—26,400 turns
DC–DC converter 6—300 v.
Inductance 9—30µH A condenser-discharge ignition system in accordance with this invention having the above characteristics acted satisfactorily, particulary in connection with the turning off action of the silicon control recitfier 4.

While a particular embodiment of the invention has been illustrated and described, modifications thereof will readily occur to those skilled in the art.

What is claimed as new and desired to be secured by Letters Patent of the United States is:

1. A condenser-discharge ignition system comprising a direct current-direct current converter having a positive pole and a negative pole, a condenser, an ignition coil having a primary winding and a secondary winding, an ignition plug having a cathode first pole and an earthing pole, a silicon control rectifier having an anode and a cathode, a diode having an anode and a cathode, and an inductance, said condenser being connected between said converter positive pole and said converter negative pole, said converter positive pole being connected with one end of said primary winding, the anode of said silicon control rectifier being connected with the opposite end of said primary winding, said converter negative pole being connected with the cathode of said silicon control rectifier, one end of said secondary winding being connected with said cathode first pole of said ignition plug, the other end of said secondary winding being connected with said earthing pole of said ignition plug and also connected with the negative pole of said converter and a ground, a circuit, containing said diode and said inductance connected in series, being connected in parallel with said primary winding, and said diode being connected and poled in such a manner that a current tending to flow from said converter positive pole to said converter negative pole is prevented from flowing across said circuit.

References Cited

UNITED STATES PATENTS

| | | | |
|---|---|---|---|
| 3,007,082 | 10/1961 | Kappele | 315—214 |
| 3,045,148 | 7/1962 | McNulty et al. | 123—148 X |
| 3,115,610 | 12/1963 | Beguin | 331—111 X |
| 3,193,733 | 7/1965 | Orsino | 317—148.5 |
| 3,271,593 | 9/1966 | De Vilbiss | 123—148 X |
| 3,369,151 | 2/1968 | Minks | 315—241 X |
| 3,373,314 | 3/1968 | Nilssen | 315—214 |
| 3,383,556 | 5/1968 | Tarter | 315—209 |

JAMES W. LAWRENCE, Primary Examiner

P. C. DEMEO, Assistant Examiner

U.S. Cl. X.R.

123—148; 315—212, 242; 317—148.5